United States Patent
Ogawa et al.

(10) Patent No.: US 11,064,695 B2
(45) Date of Patent: Jul. 20, 2021

(54) AGRICULTURAL FORMULATIONS, USES THEREOF AND PROCESSES FOR PREPARATION THEREOF

(71) Applicant: Valent U.S.A. LLC, Walnut Creek, CA (US)

(72) Inventors: Toshiya Ogawa, San Ramon, CA (US); Ke Zhou, San Ramon, CA (US); Jessica Tanuwidjaja, Fremont, CA (US)

(73) Assignee: VALENT U.S.A., LLC, Walnut Creek, CA (US)

( * ) Notice: Subject to any disclaimer, the term of this patent is extended or adjusted under 35 U.S.C. 154(b) by 0 days.

(21) Appl. No.: 16/276,959

(22) Filed: Feb. 15, 2019

(65) Prior Publication Data

US 2019/0274301 A1    Sep. 12, 2019

Related U.S. Application Data

(60) Provisional application No. 62/631,598, filed on Feb. 16, 2018.

(51) Int. Cl.
| | | |
|---|---|---|
| *A01N 25/04* | (2006.01) | |
| *A01N 43/78* | (2006.01) | |
| *A01N 47/44* | (2006.01) | |
| *A01N 43/56* | (2006.01) | |
| *A01N 43/80* | (2006.01) | |
| *A01N 37/26* | (2006.01) | |
| *A01N 37/46* | (2006.01) | |

(52) U.S. Cl.
CPC .............. *A01N 25/04* (2013.01); *A01N 37/26* (2013.01); *A01N 37/46* (2013.01); *A01N 43/56* (2013.01); *A01N 43/78* (2013.01); *A01N 43/80* (2013.01); *A01N 47/44* (2013.01)

(58) Field of Classification Search
USPC ........................................................ 514/370
See application file for complete search history.

(56) References Cited

U.S. PATENT DOCUMENTS

| | | |
|---|---|---|
| 6,156,803 A | 12/2000 | Curry et al. |
| 2015/0038328 A1 | 2/2015 | Matsuzaki |
| 2015/0264923 A1 | 9/2015 | Schneider et al. |
| 2015/0342189 A1 | 12/2015 | Ding et al. |
| 2015/0351384 A1 | 12/2015 | Sato et al. |
| 2017/0055527 A1 | 3/2017 | Klimov et al. |
| 2018/0020668 A1 | 1/2018 | Arthur et al. |

FOREIGN PATENT DOCUMENTS

| | | |
|---|---|---|
| WO | 2007128541 A2 | 11/2007 |
| WO | 2014130653 A1 | 8/2014 |

OTHER PUBLICATIONS

International Search Report and Written Opinion dated May 17, 2019.
Raymond A. Cloyd (2011). Pesticide Mixtures, Pesticides—Formulations, Effects, Fate, Prof. Margarita Stoytcheva (Ed.), ISBN: 978-953-307-532-7, InTech, Available from: http://www.intechopen.com/books/pesticides-formulations-effects-fate/pesticide-mixtures.

*Primary Examiner* — Kathrien A Cruz
(74) *Attorney, Agent, or Firm* — Wood, Phillips, Katz, Clark & Mortimer

(57) ABSTRACT

The present invention is generally directed to an agricultural formulation comprising, ethaboxam, metalaxyl and a compound selected from the group consisting of 3-(difluoromethyl)-1-methyl-N-[(3R)-1,1,3-trimethyl-2,3-dihydroinden-4-yl]pyrazole-4-carboxamide and mandestrobin, a process for preparing the agricultural formulation and methods of use thereof.

17 Claims, No Drawings

AGRICULTURAL FORMULATIONS, USES THEREOF AND PROCESSES FOR PREPARATION THEREOF

FIELD OF THE INVENTION

The present invention is generally related to an agricultural formulation comprising ethaboxam, metalaxyl and a compound selected from the group consisting of 3-(difluoromethyl)-1-methyl-N-[(3R)-1,1,3-trimethyl-2,3-dihydroinden-4-yl]pyrazole-4-carboxamide and mandestrobin, a process for preparing the agricultural formulation and methods of use thereof.

BACKGROUND OF THE INVENTION

Fungal infections are a major concern for crop growers. Fungi can be present on the seed surface prior to planting, they can be soil-borne, or they can be introduced into the growing environment by mobile pests or equipment. Fungi infect seeds and seedlings and destroy plant cells and tissues and thereby prevent seed germination or cause poor development or death of seedlings. *Aphanomyces, Fusarium, Helminthosporium, Pythium,* and *Rhizoctonia* are all known to cause infection and death of plants. These organisms cause seed rot, damping-off, seed blight, and root rot. Even diseases that affect adult plants can be controlled by pesticidal seed treatments (e.g., smuts caused by *Ustilago, Tilletia,* and *Urocystis*).

Metalaxyl is a widely used fungicide for controlling diseases among crops. Metalaxyl is the active ingredient in the seed treatment marketed as Sebring® 318 FS (Sebring is a registered trademark of and available from Nufarm Americas Inc) and Allegiance® FL. However, metalaxyl presents many formulations challenges including its low melting point (63-72° C.) and partial water solubility (8,400 parts per million). Liquid formulations of metalaxyl often form large crystals upon storage. Further, due to its low melting point, formulating metalaxyl with other low-melting point pesticides is highly problematic. To date there is no known finely milled aqueous slurry of metalaxyl and another low-melting point pesticide.

There remains a need in the art for physically and chemically stable formulations containing metalaxyl and other low-melting point pesticides useful for seed treatment that provides improved protection against fungal pests. Further, there is a need in the art for a process to prepare such physically and chemically stable formulations containing metalaxyl and other low-melting point pesticides.

SUMMARY OF THE INVENTION

The present invention is directed to an agricultural formulation comprising ethaboxam, metalaxyl, a compound selected from the group consisting of 3-(difluoromethyl)-1-methyl-N-[(3R)-1,1,3-trimethyl-2,3-dihydroinden-4-yl] pyrazole-4-carboxamide and mandestrobin, propylene glycol, water, a colorant dispersant, a wetting agent selected from the group consisting of methyloxirane polymer, alkylphenol ethoxylate free nonionic wetter and polyoxyethylene tristyrylphenol phosphate, a sodium salt of naphthalene sulfonate condensate, a mixture of sodium salt of alkyl vinyl ether/maleic acid half-ester copolymer and polyvinyl pyrrolidone, and a silicone emulsion.

The present invention is further directed to a process for preparing an agricultural formulation comprising ethaboxam, metalaxyl and a compound selected from the group consisting of 3-(difluoromethyl)-1-methyl-N-[(3R)-1,1,3-trimethyl-2,3-dihydroinden-4-yl]pyrazole-4-carboxamide and mandestrobin, comprising the steps of:
   bead milling ethaboxam and a compound selected from the group consisting of 3-(difluoromethyl)-1-methyl-N-[(3R)-1,1,3-trimethyl-2,3-dihydroinden-4-yl]pyrazole-4-carboxamide and mandestrobin, to create a mill base;
   adding metalaxyl to propylene glycol at a temperature of 54° C. and stirring to create a metalaxyl solution; and
   adding the metalaxyl solution to the mill base while agitating to create the agricultural formulation.

The present invention is further directed to an agricultural formulation comprising ethaboxam, metalaxyl and a compound selected from the group consisting of 3-(difluoromethyl)-1-methyl-N-[(3R)-1,1,3-trimethyl-2,3-dihydroinden-4-yl]pyrazole-4-carboxamide and mandestrobin, produced by a process comprising the steps of:
   bead milling ethaboxam and a compound selected from the group consisting of 3-(difluoromethyl)-1-methyl-N-[(3R)-1,1,3-trimethyl-2,3-dihydroinden-4-yl]pyrazole-4-carboxamide and mandestrobin, to create a mill base;
   adding metalaxyl to propylene glycol at a temperature of 54° C. and stirring to create a metalaxyl solution; and
   adding the metalaxyl solution to the mill base while agitating to create the agricultural formulation.

The present invention is further directed to a method of protecting plants comprising treating plant propagation material with a fungicidally effective amount of an agricultural formulation of the present invention.

The present invention is further directed to a method for controlling or preventing pest damage of plants comprising applying to the plant propagation material an effective amount of an agricultural formulation of the present invention onto a plant propagation material.

DETAILED DESCRIPTION OF THE INVENTION

The Applicant has discovered a stable agricultural formulation comprising ethaboxam, metalaxyl and a compound selected from the group consisting of 3-(difluoromethyl)-1-methyl-N-[(3R)-1,1,3-trimethyl-2,3-dihydroinden-4-yl] pyrazole-4-carboxamide and mandestrobin can be produced. The Applicant has further discovered a process by which these agricultural formulations can be made. A stable agricultural formulation comprising ethaboxam, metalaxyl and a compound selected from the group consisting of 3-(difluoromethyl)-1-methyl-N-[(3R)-1,1,3-trimethyl-2,3-dihydroinden-4-yl]pyrazole-4-carboxamide and mandestrobin is unexpected because of the co-melting that occurs between metalaxyl and other low-melting point actives. As previously mentioned, stable formulations containing metalaxyl are difficult to obtain because metalaxyl forms undesirable crystals. Applicants unexpectedly found that processes and formulations of the present invention provide a superior solution to this known problem in the art. Further, the agricultural formulation of the present invention is surprisingly stable when blended with NipsIt INSIDE®.

In one embodiment, the present invention is directed to an agricultural formulation comprising a compound selected from the group consisting of 3-(difluoromethyl)-1-methyl-N-[(3R)-1,1,3-trimethyl-2,3-dihydroinden-4-yl]pyrazole-4-carboxamide and mandestrobin, preferably at a concentration from about 1% to about 10% w/w, ethaboxam, preferably at a concentration from about 1% to about 10% w/w, metalaxyl, preferably at a concentration from about 1% to about 5% w/w, propylene glycol, preferably at a concentration from about 10% to about 50% w/w, the wetting agent, preferably at a concentration from about 0.05% to about 10% w/w, a sodium salt of naphthalene sulfonate condensate, preferably at a concentration from about 0.1% to about 2% w/w, a mixture of sodium salt of alkyl vinyl ether/maleic acid half-ester copolymer and polyvinyl pyrrolidone, preferably at a concentration from about 0.01% to about 2% w/w, and a silicone emulsion, preferably at a concentration from about 0.01% to about 1% w/w. and optionally, xanthan gum, preferably at a concentration from about 0.01% to about 1% w/w and 1,2-benzisothiazolin-3-one prepared at a concentration of 19.3%, preferably at a concentration from about 0.01% to about 1% w/w, and optionally, a colorant, preferably at a concentration from about 1% to 30% w/w.

In another embodiment, the present invention is further directed to a process for preparing an agricultural formulation comprising ethaboxam, metalaxyl and a compound selected from the group consisting of 3-(difluoromethyl)-1-methyl-N-[(3R)-1,1,3-trimethyl-2,3-dihydroinden-4-yl]pyrazole-4-carboxamide and mandestrobin, comprising the steps of:
  bead milling ethaboxam and a compound selected from the group consisting of 3-(difluoromethyl)-1-methyl-N-[(3R)-1,1,3-trimethyl-2,3-dihydroinden-4-yl]pyrazole-4-carboxamide and mandestrobin, to create a mill base;
  adding metalaxyl to propylene glycol, preferably at a temperature from about 40° C. to about 70° C., more preferably at a temperature of 54° C. and stirring to create a metalaxyl solution; and
  adding the metalaxyl solution to the mill base while agitating to create the agricultural formulation.

In another embodiment, the present invention is further directed to an agricultural formulation comprising ethaboxam, metalaxyl and a compound selected from the group consisting of 3-(difluoromethyl)-1-methyl-N-[(3R)-1,1,3-trimethyl-2,3-dihydroinden-4-yl]pyrazole-4-carboxamide and mandestrobin, produced by a process comprising the steps of:
  bead milling ethaboxam and a compound selected from the group consisting of 3-(difluoromethyl)-1-methyl-N-[(3R)-1,1,3-trimethyl-2,3-dihydroinden-4-yl]pyrazole-4-carboxamide and mandestrobin, to create a mill base;
  adding metalaxyl to propylene glycol preferably at a temperature from about 40° C. to about 70° C., more preferably at a temperature of 54° C. and stirring to create a metalaxyl solution; and
  adding the metalaxyl solution to the mill base while agitating to create the agricultural formulation.

In a preferred embodiment, the mill base comprises from about 1% to about 50% w/w ethaboxam, preferably about 15% to about 30% w/w and more preferably from about 19% to about 27% w/w and from about 1% to about 50% w/w of a compound selected from the group consisting of 3-(difluoromethyl)-1-methyl-N-[(3 R)-1,1,3-trimethyl-2,3-dihydroinden-4-yl]pyrazole-4-carboxamide and mandestrobin, preferably about 15% to about 30% w/w and more preferably from about 18% to about 26% w/w.

In another preferred embodiment, the mill base comprises methyloxirane polymer, preferably at a concentration from about 0.1% to about 3% w/w, a sodium salt of naphthalene sulfonate condensate, preferably at a concentration from about 0.1% to about 2% w/w, a mixture of sodium salt of alkyl vinyl ether/maleic acid half-ester and polyvinyl pyrrolidone, preferably at a concentration from about 0.1% to about 1.1% w/w, a silicone emulsion, preferably at a concentration from about 0.01% to about 1.0% w/w, xanthan gum, preferably at a concentration from about 0.01% to about 1.0% w/w, 1,2-benzisothiazolin-3-one prepared at a concentration of 19.3%, preferably at a concentration from about 0.01% to about 1.0% w/w and water, preferably at a concentration from about 18% to about 98% w/w.

In another preferred embodiment, the metalaxyl solution comprises from about 1% to about 20% w/w metalaxyl and from about 80% to about 99% propylene glycol.

In another preferred embodiment, the agricultural formulation further comprises additional propylene glycol, preferably at a concentration from about 10% to about 20% w/w, a wetting agent selected from the additional methyloxirane polymer, an alkylphenol ethoxylate free nonionic wetter and polyoxyethylene tristyrylphenol phosphate, preferably the wetting agent is at a concentration from about 0.5% to about 5% w/w, a colorant dispersion and water.

In another preferred embodiment, the agricultural formulation further comprises additional mixture of sodium salt of alkyl vinyl ether/maleic acid half-ester copolymer and polyvinyl pyrrolidone, 25% carnauba wax emulsion, additional xanthan gum and additional 1,2-benzisothiazolin-3-one.

In another preferred embodiment, the agricultural formulation comprises from about 15% to about 35% w/w of the mill base and from about 10% to about 30% w/w of the metalaxyl solution.

In another preferred embodiment, the agricultural formulation further comprises clothianidin.

In another embodiment, the present invention is further directed to an agricultural formulation comprising:
  about 3.13% w/w mandestrobin;
  about 2.35% w/w ethaboxam;
  about 1.25% w/w metalaxyl;
  about 34.04% w/w propylene glycol;
  about 7.33% w/w of a colorant dispersant;
  about 0.065% w/w methyloxirane polymer;
  about 0.26% or 1.26% w/w of a sodium salt of naphthalene sulfonate condensate;
  about 0.065% w/w of a mixture of sodium salt of alkyl vinyl ether/maleic acid half-ester copolymer and polyvinyl pyrrolidone;
  about 0.026% w/w of a silicone emulsion;
  about 0.3% w/w xanthan gum;
  about 0.24% w/w 1,2-benzisothiazolin-3-one prepared at a concentration of 19.3%;
  about 1.0% or 3.0% w/w polyoxyethylene tristyrylphenol phosphate, potassium salt;
  about 2.5% w/w carnauba wax; and
  optionally, about 1.0% w/w alkylphenol ethoxylate free nonionic wetter and dispersant package.

In another embodiment, the present invention is further directed to an agricultural formulation comprising:
  about 4.7% w/w 3-(difluoromethyl)-1-methyl-N-[(3R)-1,1,3-trimethyl-2,3-dihydroinden-4-yl]pyrazole-4-carboxamide;
  about 7.1% w/w ethaboxam;
  about 1.9% w/w metalaxyl;
  about 32.2% w/w propylene glycol;
  about 20.5% w/w of a colorant dispersant;
  about 2.1% w/w methyloxirane polymer;
  about 0.26% w/w of a sodium salt of naphthalene sulfonate condensate;
  about 0.07% w/w of a mixture of sodium salt of alkyl vinyl ether/maleic acid half-ester copolymer and polyvinyl pyrrolidone;

about 0.03% w/w of a silicone emulsion;
about 0.15% w/w xanthan gum; and
about 0.24% w/w 1,2-benzisothiazolin-3-one prepared at a concentration of 19.3%.

In another embodiment, the present invention is further directed to an agricultural formulation comprising:
about 3.6% w/w 3-(difluoromethyl)-1-methyl-N-[(3 R)-1,1,3-trimethyl-2,3-dihydroinden-4-yl]pyrazole-4-carboxamide;
about 5.3% w/w ethaboxam;
about 2.8% w/w metalaxyl;
about 43.0% w/w propylene glycol;
about 15.5% w/w of a colorant dispersant;
about 1.9% w/w methyloxirane polymer;
about 0.2% w/w of a sodium salt of naphthalene sulfonate condensate;
about 0.51% w/w of a mixture of sodium salt of alkyl vinyl ether/maleic acid half-ester copolymer and polyvinyl pyrrolidone;
about 0.02% w/w of a silicone emulsion;
about 0.12% w/w xanthan gum; and
about 0.24% w/w 1,2-benzisothiazolin-3-one prepared at a concentration of 19.3%.

In another embodiment, the present invention is further directed to a method of protecting plants comprising treating plant propagation material with a fungicidally effective amount of an agricultural formulation of the present invention.

In another embodiment, the present invention is further directed to a method for controlling or preventing pest damage of plants comprising applying to the plant propagation material an effective amount of an agricultural formulation of the present invention onto a plant propagation material.

As used herein, "plant propagation material" refers to seeds, bulbs, rhizomes and tubers.

In a preferred embodiment, the plant propagation material is a seed. In a more preferred embodiment, the formulations of the present invention are applied to the seeds before they are planted.

In another preferred embodiment, the plant that is treated is a crop plant. In a more preferred embodiment, the crop plant is selected from the group consisting of corn, soybeans, beans, peas, lentils, flax, wheat, rice, canola, sorghum, barley, oats, rye, millet and sugar beets.

The phrase "effective amount" of the formulation means a sufficient amount of the formulation to provide the desired effect. In general, the formulation is employed in amounts that do not inhibit germination of the seeds (or cause phytotoxic damage to the seeds) while providing adequate pest control. Pest control can mean reducing pest damage to the plant, reducing the amount of pests on the plant or in its immediate environment, or preventing the pests from reproducing, among other things. The amount of the formulation may vary depending on specific crops and other factors. It is well within the ordinary skill in the art to determine the necessary amount of the formulation.

As used herein, "pest" refers to pathogens and parasites that negatively affect the host plants by colonizing, attacking, irritating, or feeding upon them, or competing for nutrients with the host. A pest may be, for example, an undesirable bacterium, fungus including fungal pathogens, or insect.

Fungal pathogens include but are not limited to *Rhizoctonia, Fusarium, Pythium Phytophthora, Phomopsis,* and seed decay fungi including *Aspergillus, Penicillium, Alternaria, Rhizopus,* and *Basidiomycete* bunt and smut fungi.

As used herein, "plant" and "plants" refer to wild type and genetically modified members of the plant kingdom, including higher (vascular) plants and lower (non-vascular) plants.

As used herein, "crop plants" refers to cereal, legumes, forage crops, stem and leaf crops, tuber, bulb and root crops, fruit and seed vegetables, fruit and nut crops, beverage crops, oil, fat and wax crops, spices, perfumes and flavorings, and ornamentals, forest and fiber crops.

The formulations of the present invention may be applied simultaneous or sequentially to the areas in need of treatment.

The formulations of the present invention can be applied to any environment in need of pest control. The environment in need of pest control may include any area that is desired to have a reduced number of pests or to be free of pests. For example, the pesticide can be applied to areas where crop plants are grown.

As used herein, "controlling or preventing pest damage in a growing plant" refers to maintaining the population of the target pest at a rate per plant such that the plant is viable and produces an agriculturally useful product.

As used herein, all numerical values relating to amounts, weights, and the like, that are defined as "about" each particular value is plus or minus 10%. For example, the phrase "about 10% w/w" is to be understood as "9% w/w to 11% w/w." Therefore, amounts within 10% of the claimed value are encompassed by the scope of the claims.

As used herein "% w/w" and "percent w/w" refer to the percent weight of the total formulation.

The disclosed embodiments are simply exemplary embodiments of the inventive concepts disclosed herein and should not be considered as limiting, unless the claims expressly state otherwise.

The following examples are intended to illustrate the present invention and to teach one of ordinary skill in the art how to use the formulations of the invention. They are not intended to be limiting in any way.

EXAMPLES

Example 1-Preparing a stable 3-(di fluoromethyl)-1-methyl-N- [(3R)-1,1,3-trimethyl-2,3-dihydroinden-4-yl]pyrazole-4-carboxamide, ethaboxam, and metalaxyl formulation

TABLE 1

| Mill Base | % w/w |
| --- | --- |
| Ethaboxam | 27.00 |
| 3-(difluoromethyl)-1-methyl-N-[(3R)-1,1,3-trimethyl-2,3-dihydroinden-4-yl]pyrazole-4-carboxamide | 18.00 |
| Methyloxirane polymer | 0.25 |
| Sodium salt of naphthalene sulfonate condensate | 1.00 |
| Mixture of sodium salt of alkyl vinyl ether/maleic acid half-ester copolymer and polyvinyl pyrrolidone | 0.25 |
| Silicone emulsion | 0.10 |
| Xanthan gum | 0.12 |

TABLE 1-continued

| Mill Base | % w/w |
|---|---|
| 19.3% 1,2-benzisothiazolin-3-one | 0.12 |
| Water | 53.16 |

TABLE 2

| % w/w | 1A | 2A | 3A | 4A | 5A | 6A | 7A |
|---|---|---|---|---|---|---|---|
| Mill base | 25.818 | 25.818 | 25.818 | 25.818 | 25.818 | 25.818 | 25.818 |
| 10% Metalaxyl Solution | 20.091 | 20.091 | 20.091 | 20.091 | 20.091 | 20.091 | 20.091 |
| Propylene Glycol | 13.636 | 13.636 | 13.636 | 13.636 | 13.636 | 13.636 | 13.636 |
| Alkylphenol ethoxylate free nonionic wetter and dispersant package | 1.818 | 3.636 | — | — | — | — | — |
| Methyloxirane polymer | — | — | 1.818 | 3.636 | 1.000 | 2.000 | 3.000 |
| Colorant Dispersion | 20.182 | 20.182 | 20.182 | 20.182 | 20.182 | 20.182 | 20.182 |
| Water | 18.455 | 16.637 | 18.455 | 16.637 | 19.273 | 18.273 | 17.273 |

Ethaboxam TG was used as the source of ethaboxam and is available from Sumitomo Chemical.

3-(Difluoromethyl)-1-methyl-N-[(3R)-1,1,3-trimethyl-2,3-dihydroinden-4-yl]pyrazole-4-carboxamide is available from Sumitomo Chemical.

Metalaxyl TG was used as the source for metalaxyl and is available from Nufarm Americas, Inc.

Pluronic® P-104 was used as the source of methyloxirane polymer (Pluronic is a registered trademark of and available from BASF Corporation).

Morwet® D-425 was used as the source of sodium salt of naphthalene sulfonate condensate (Morwet is a registered trademark of and available from Akzo Nobel Surface Chemistry LLC).

Easy-Sperse® P-20 was used as the source of mixture of sodium salt of alkyl vinyl ether/maleic acid half-ester copolymer and polyvinyl pyrrolidone (Easy-Sperse is a registered trademark of ISP Investments, Inc. and is available from Ashland).

Tersperse® 4894 was used as the source of alkylphenol ethoxylate free nonionic wetter and dispersant package (Tersperse is a registered trademark of and available from Huntsman Petrochemical Corporation).

Xiameter® AFE-0010 was used the source of silicone emulsion (Xiameter is a registered trademark of and available from Dow Corning Corporation).

Kelzan® CC was used as the source of xanthan gum (Kelzan is a registered trademark of and available from CP Kelco).

Proxel® GXL was used as the source of 19.3% 1,2-benzisothiazolin-3-one (Proxel is a registered trademark of Arch UK Biocides and is available from Lonza).

Treating Solutions™ Red 1048 was used as the source of colorant dispersion (Treating Solutions is a trademark of and available from Milliken & Company).

Method

Methyloxirane polymer, a sodium salt of naphthalene sulfonate condensate, a mixture of sodium salt of alkyl vinyl ether/maleic acid half-ester copolymer and polyvinyl pyrrolidone and a silicone emulsion were added to water under mechanical agitation until dissolved to create an excipient solution. 3-(difluoromethyl)-1-methyl-N-[(3R)-1,1,3-trimethyl-2,3-dihydroinden-4-yl]pyrazole-4-carboxamide and ethaboxam were then dispersed in the excipient solution to create an active dispersion. The active solution was then milled with ceramic beads until the median particle diameter was less than 2.0 μm to achieve a milled suspension. Finally, an aqueous solution of xanthan gum and 19.3% 1,2-benzisothiazolin-3-one was added to the milled suspension to create a mill base. 20.8 grams of metalaxyl was dissolved in 200 grams of propylene glycol at 54° C. and then stirred to create a metalaxyl/propylene glycol solution. Alkylphenol ethoxylate free nonionic wetter and dispersant package or additional methyloxirane polymer was added to water under mechanical agitation until dissolved to create a surfactant solution. The surfactant solution was then added to the mill base while undergoing agitation. The rest of propylene glycol and the metalaxyl/propylene glycol solution were then added to the above-mentioned formulation followed by a colorant dispersion while undergoing agitation to create the final formulations.

Example 2-Storage Stability of Formulations 1A-7A

Methods

Formulations 1A-7A from Table 2, above, were each separately subjected to 5 cycles of freeze thaw, 2 weeks at 54° C. and optionally, 4 weeks at 50° C. The physical properties of the Formulations 1A-4A are detailed in Table 3, below. Bottom clear time is the time until the formulation flows away from the container bottom when approximately 62.5 milliliters of the formulation is placed in a 125-milliliter plastic jar and placed on its side. Formulations 1A-4A were prepared as a small batch and 20 grams of each were stored in separate 30-milliliter glass vial. Formulations 5A-7A were prepared as a large batch and 70 grams of each were stored in a plastic jar. Chemical properties of Formulations 5A and 7A are detailed in Table 4, below.

TABLE 3

|  | 1A | | | 2A | | | 3A | | | 4A | | |
| --- | --- | --- | --- | --- | --- | --- | --- | --- | --- | --- | --- | --- |
|  | Initial | F/T Cycle | 2 Weeks 54° C. | Initial | F/T Cycle | 2 Weeks 54° C. | Initial | F/T Cycle | 2 Weeks 54° C. | Initial | F/T Cycle | 2 Weeks 54° C. |
| Syneresis % | n/a | 0 | 10 | n/a | 0 | 15 | n/a | 0 | 4.6 | n/a | 0 | 6 |
| Bottom Clear Time | n/a | <1' | >26" | n/a | <1" | >8' | n/a | <1" | 4'48" | n/a | <1" | 13" |
| pH | 7.36 | 7.33 | 7.28 | 7.35 | 7.23 | 7.11 | 7.60 | 7.53 | 7.34 | 7.55 | 7.49 | 7.34 |
| Particle Size ($d_{0.5}$ μm) | 1.60 | 1.42 | 2.11 | 1.45 | 1.56 | 1.62 | 1.46 | 1.46 | 1.46 | 1.54 | 1.68 | 2.70 |
| Viscosity (50 $s^{-1}$ mPa) | 49.50 | 68.00 | 64.80 | 50.10 | 55.00 | 52.60 | 46.90 | 56.50 | 56.80 | 66.10 | 78.30 | 63.80 |
| Sieve Residue (% > 150 μm) | n/a | 0.014 | 0.15 | n/a | 0.007 | 0.066 | n/a | 0.015 | 0.014 | n/a | 0.065 | 0.02 |

|  | 5A | | | | 6A | | | | 7A | | | |
| --- | --- | --- | --- | --- | --- | --- | --- | --- | --- | --- | --- | --- |
|  | Initial | F/T Cycle | 2 Weeks 54° C. | 4 Weeks 50° C. | Initial | F/T Cycle | 2 Weeks 54° C. | 4 Weeks 50° C. | Initial | F/T Cycle | 2 Weeks 54° C. | 4 Weeks 50° C. |
| Syneresis % | n/a | 0 | 9.5 | 4.2 | n/a | 0 | Trace | 7.9 | n/a | 0 | Trace | 7.9 |
| Bottom Clear Time | n/a | <1" | >30' | >30' | n/a | <1" | 10" | 12" | n/a | <1" | 10" | 10" |
| pH | 7.53 | 7.52 | 7.27 | 7.26 | 7.42 | 7.53 | 7.28 | 7.28 | 7.48 | 7.62 | 7.40 | 7.28 |
| Particle Size ($d_{0.5}$ μm) | 1.56 | 1.93 | 1.98 | 1.83 | 1.54 | 1.70 | 1.62 | 1.57 | 1.52 | 1.81 | 1.53 | 1.49 |
| Viscosity (50 $s^{-1}$ mPa) | 38.70 | 70.90 | 72.50 | 63.00 | 42.10 | 61.90 | 60.60 | 60.60 | 46.60 | 65.90 | 61.00 | 64.10 |
| Sieve Residue (% > 150 μm) | n/a | 0.002 | 0.003 | 0.003 | n/a | 0.003 | 0.001 | 0.004 | n/a | 0.003 | 0.001 | 0.004 |

TABLE 4

|  | 5A | | | | 7A | | | |
| --- | --- | --- | --- | --- | --- | --- | --- | --- |
| % w/w | Initial | F/T Cycle | 2 Weeks 54° C. | 4 Weeks 50° C. | Initial | F/T Cycle | 2 Weeks 54° C. | 4 Weeks 50° C. |
| Ethaboxam | 7.03 | 6.84 | 6.77 | 6.73 | 6.96 | 6.96 | 6.87 | 6.83 |
| 3-(difluoromethyl)-1-methyl-N-[(3R)-1,1,3-trimethyl-2,3-dihydroinden-4-yl]pyrazole-4-carboxamide | 4.71 | 4.60 | 4.62 | 4.61 | 4.69 | 4.55 | 4.57 | 4.60 |
| Metalaxyl | 1.94 | 1.95 | 1.95 | 1.93 | 1.97 | 1.95 | 1.95 | 1.96 |

Results

As can be seen in Tables 3 and 4, formulations of the present invention are physically and chemically stable following accelerated storage testing.

Example 3-Stability of a Blend of Formulations 1A-7A with Nipslt INSIDE®

Methods

Formulations 1A-7A from Table 2, above, were each blended with Nipslt INSIDE® (Nipslt INSIDE is a registered trademark of and available from Valent U.S.A. LLC) at approximately 1:1 ratio, and separately subjected to 5 cycles of freeze thaw, 2 weeks at 54° C. and optionally, 4 weeks at 40° C. The physical properties of the final formulations are detailed in Table 5, below.

TABLE 5

| | 1A + NipsIt INSIDE® | | | 2A + NipsIt INSIDE® | | |
|---|---|---|---|---|---|---|
| | Initial | F/T Cycle | 2 Weeks 54° C. | Initial | F/T Cycle | 2 Weeks 54° C. |
| Syneresis % | n/a | 4.9 | 7.4 | n/a | 4.9 | 7.4 |
| Bottom Clear Time | n/a | 1'18" | 12" | n/a | 11" | 12" |
| pH | 7.11 | 7.09 | 7.02 | 7.04 | 6.89 | 6.97 |
| Particle Size ($d_{0.5}$ μm) | 1.29 | 1.66 | 1.70 | 1.57 | 1.92 | 1.76 |
| Viscosity (50 $s^{-1}$ mPa) | 74.10 | 88.60 | 78.90 | 84.50 | 105.00 | 85.00 |
| Sieve Residue (% > 150 μm) | n/a | 0.017 | 0.021 | n/a | 0.02 | 0.023 |

| | 3A + NipsIt INSIDE® | | | 4A + NipsIt INSIDE® | | |
|---|---|---|---|---|---|---|
| | Initial | F/T Cycle | 2 Weeks 54° C. | Initial | F/T Cycle | 2 Weeks 54° C. |
| Syneresis % | n/a | 4.9 | 7.3 | n/a | 4.9 | 5 |
| Bottom Clear Time | n/a | 103" | 12" | n/a | 15" | 12" |
| pH | 7.25 | 7.06 | 7.20 | 7.19 | 7.01 | 7.16 |
| Particle Size ($d_{0.5}$ μm) | 1.51 | 1.98 | 1.67 | 1.64 | 2.02 | 1.61 |
| Viscosity (50 $s^{-1}$ mPa) | 82.40 | 102.00 | 83.00 | 95.70 | 110.00 | 95.50 |
| Sieve Residue (% > 150 μm) | n/a | 0.023 | 0.033 | n/a | 0.029 | 0.045 |

| | 5A + NipsIt INSIDE® | | | | 6A + NipsIt INSIDE® | | | |
|---|---|---|---|---|---|---|---|---|
| | Initial | F/T Cycle | 2 Weeks 54° C. | 4 Weeks 40° C. | Initial | F/T Cycle | 2 Weeks 54° C. | 4 Weeks 40° C. |
| Syneresis % | n/a | 5.7 | 13 | 9.9 | n/a | 7.3 | 10 | 9.3 |
| Bottom Clear Time | n/a | 9" | 20" | 40" | n/a | 9" | 20" | 1'40" |
| pH | 7.18 | 7.19 | 7.21 | 6.88 | 7.06 | 7.08 | 7.25 | 6.84 |
| Particle Size ($d_{0.5}$ μm) | 1.58 | 1.88 | 1.59 | 1.72 | 1.58 | 1.88 | 1.67 | 1.66 |
| Viscosity (50 $s^{-1}$ mPa) | 74.60 | 91.50 | 77.90 | 93.50 | 75.50 | 95.60 | 79.90 | 111.00 |
| Sieve Residue (% > 150 μm) | n/a | 0.013 | 0.002 | 0.003 | n/a | 0.007 | 0.003 | 0.003 |

| | 7A + NipsIt INSIDE® | | | |
|---|---|---|---|---|
| | Initial | F/T Cycle | 2 Weeks 54° C. | 4 Weeks 40° C. |
| Syneresis % | n/a | 8.5 | 13 | 14 |
| Bottom Clear Time | n/a | 9" | 20" | 3'20" |
| pH | 7.16 | 7.13 | 7.27 | 6.89 |
| Particle Size ($d_{0.5}$ μm) | 1.59 | 1.89 | 1.65 | 1.52 |
| Viscosity (50 $s^{-1}$ mPa) | 77.10 | 97.10 | 80.90 | 90.70 |
| Sieve Residue (% > 150 μm) | n/a | 0.010 | 0.006 | 0.005 |

Results

As can be seen in Table 5, formulations of the present invention blended with NipsIt INSIDE® are physically stable following accelerated storage testing.

Example 4-Preparing a Stable 3-(difluoromethyl)-1-methyl-N-[(3R)-1,1,3-trimethyl-2,3-dihydroinden-4-yl]pyrazole-4-carboxamide, ethaboxam, and metalaxyl Formulation

TABLE 6

| Mill Base | % w/w |
|---|---|
| Ethaboxam | 27.00 |
| 3-(difluoromethyl)-1-methyl-N-[(3R)-1,1,3-trimethyl-2,3-dihydroinden-4-yl]pyrazole-4-carboxamide | 18.00 |
| Methyloxirane polymer | 0.25 |
| Sodium salt of naphthalene sulfonate condensate | 1.00 |
| Mixture of sodium salt of alkyl vinyl ether/maleic acid half-ester copolymer and polyvinyl pyrrolidone | 0.25 |
| Silicone emulsion | 0.10 |
| Xanthan gum | 0.12 |
| 19.3% 1,2-benzisothiazolin-3-one | 0.12 |
| Water | 53.16 |

TABLE 7

| | % w/w | | | |
|---|---|---|---|---|
| | 8A | 8B | 9A | 10A |
| Mill base | 19.72 | 19.72 | 19.72 | 19.72 |
| 10% Metalaxyl Solution | 28.43 | 28.43 | 28.43 | 28.43 |
| Propylene Glycol | 17.41 | 17.41 | 17.41 | 17.36 |
| Mixture of sodium salt of alkyl vinyl ether/maleic acid half-ester copolymer and polyvinyl pyrrolidone | 0.46 | 0.46 | 0.65 | 0.46 |
| Methyloxirane polymer | 1.85 | 1.85 | 1.85 | 2.46 |
| Xanthan gum | 0.097 | 0.097 | 0.097 | 0.097 |
| 19.3% 1,2-benzisothiazolin-3-one | 0.097 | 0.217 | 0.097 | 0.097 |
| Colorant Dispersion | 15.46 | 15.46 | 15.46 | 15.46 |
| Water | 16.476 | 16.356 | 16.286 | 15.916 |

Ethaboxam TG was used as the source of ethaboxam and is available from Sumitomo Chemical.

3-(Difluoromethyl)-1-methyl-N-[(3R)-1,1,3-trimethyl-2,3-dihydroinden-4-yl]pyrazole-4-carboxamide is available from Sumitomo Chemical.

Metalaxyl TG was used as the source for metalaxyl and is available from Nufarm Americas, Inc.

Pluronic® P-104 was used as the source of methyloxirane polymer.

Morwet® D-425 was used as the source of sodium salt of naphthalene sulfonate condensate.

Easy-Sperse® P-20 was used as the source of mixture of sodium salt of alkyl vinyl ether/maleic acid half-ester copolymer and polyvinyl pyrrolidone.

Xiameter® AFE-0010 was used the source of silicone emulsion.

Kelzan® CC was used as the source of xanthan gum.

Proxel® GXL was used as the source of 19.3% 1,2-benzisothiazolin-3-one.

Treating Solutions™ Red 1048 was used as the source of colorant dispersion.

Method

Methyloxirane polymer, a sodium salt of naphthalene sulfonate condensate, a mixture of sodium salt of alkyl vinyl ether/maleic acid half-ester copolymer and polyvinyl pyrrolidone and a silicone emulsion were added to water under mechanical agitation until dissolved to create an excipient solution. 3-(difluoromethyl)-1-methyl-N-[(3R)-1,1,3-trimethyl-2,3-dihydroinden-4-yl]pyrazole-4-carboxamide and ethaboxam were then dispersed in the excipient solution to create an active dispersion. The active dispersion was then milled with ceramic beads until the median particle diameter was less than 2.0 μm to achieve a milled suspension. Finally, an aqueous solution of xanthan gum and 19.3% 1,2-benzisothiazolin-3-one was added to the milled suspension to create a mill base. 20.8 grams of metalaxyl was dissolved in 179.2 grams of propylene glycol at 54° C. and then stirred to create a metalaxyl/propylene glycol solution. Additional methyloxirane polymer was heated at 54° C. and added to propylene glycol under mechanical agitation until dissolved to create a surfactant solution. Additional aqueous solution of xanthan gum and 19.3% 1,2-benzisothiazolin-3-one, additional amount of a mixture of sodium salt of alkyl vinyl ether/maleic acid half-ester copolymer and polyvinyl pyrrolidone, the surfactant solution, propylene glycol, the metalaxyl solution, and a colorant dispersion were then added to the mill base while undergoing agitation to create the final formulations.

Example 5-Storage Stability of Formulations 8A-10A

Methods

Formulations 8A-10A from Table 7, above, were each separately subjected to 5 cycles of freeze thaw and 4 weeks at 50° C. The physical properties of the Formulations 8A-10A are detailed in Table 8, below. Bottom clear time is the time until the formulation flows away from the container bottom when approximately 62.5 milliliters of the formulation is placed in a 125-milliliter plastic jar and placed on its side. Chemical properties of Formulations 8A-10A are detailed in Table 9, below.

TABLE 8

| | 8A | | | 9A | | | 10A | | |
|---|---|---|---|---|---|---|---|---|---|
| | Initial | F/T Cycle | 4 Weeks 50° C. | Initial | F/T Cycle | 4 Weeks 50° C. | Initial | F/T Cycle | 4 Weeks 50° C. |
| Syneresis % | n/a | 0 | trace | n/a | 0 | 0 | n/a | 0 | 0 |
| Bottom Clear Time | n/a | 1" | 10" | n/a | 1" | 10" | n/a | 1" | 8" |
| pH | 7.39 | 7.43 | 7.23 | 7.16 | 7.20 | 7.02 | 7.39 | 7.41 | 7.18 |
| Particle Size ($d_{0.5}$ μm) | 1.61 | 1.80 | 1.38 | 1.52 | 1.86 | 1.43 | 1.55 | 1.81 | 1.36 |
| Viscosity (50 $s^{-1}$ mPa) | 125.9 | 135.5 | 174.3 | 117.7 | 140.3 | 177.8 | 115.1 | 144.3 | 156.0 |
| Sieve Residue (% > 150 μm) | n/a | 0.001 | 0.001 | n/a | 0.001 | 0.002 | n/a | 0.001 | 0.002 |

TABLE 9

| | 8A | | | 9A | | | 10A | | |
|---|---|---|---|---|---|---|---|---|---|
| % w/w | Initial | F/T Cycle | 4 Weeks 50° C. | Initial | F/T Cycle | 4 Weeks 50° C. | Initial | F/T Cycle | 4 Weeks 50° C. |
| Ethaboxam | 5.20 | 5.23 | 5.18 | 5.21 | 5.18 | 5.14 | 5.13 | 5.10 | 5.08 |
| 3-(difluoromethyl)-1-methyl-N-[(3R)-1,1,3-trimethyl-2,3- | 3.48 | 3.48 | 3.46 | 3.46 | 3.48 | 3.46 | 3.49 | 3.49 | 3.45 |

TABLE 9-continued

| % w/w | 8A | | | 9A | | | 10A | | |
|---|---|---|---|---|---|---|---|---|---|
| | Initial | F/T Cycle | 4 Weeks 50° C. | Initial | F/T Cycle | 4 Weeks 50° C. | Initial | F/T Cycle | 4 Weeks 50° C. |
| dihydroinden-4-yl]pyrazole-4-carboxamide | | | | | | | | | |
| Metalaxyl | 2.84 | 2.84 | 2.83 | 2.82 | 2.82 | 2.81 | 2.82 | 2.83 | 2.83 |

Results

As can be seen in Tables 8 and 9, formulations of the present invention are physically and chemically stable following accelerated storage testing.

Example 6-Stability of a Blend of Formulations 8A-10A with Nipslt INSIDE®

Methods

Formulations 8A-10A from Table 7, above, were each blended with Nipslt INSIDE® at 57:43 ratio, and separately subjected to 5 cycles of freeze thaw and 4 weeks at 50° C. The physical properties of the final formulations are detailed in Table 10, below.

TABLE 10

| | 8A + NipsIt INSIDE ® | | | 9A + NipsIt INSIDE ® | | | 10A + NipsIt INSIDE ® | | |
|---|---|---|---|---|---|---|---|---|---|
| | Initial | F/T Cycle | 4 Weeks 50° C. | Initial | F/T Cycle | 4 Weeks 50° C. | Initial | F/T Cycle | 4 Weeks 50° C. |
| Syneresis % | n/a | Trace | Trace | n/a | Trace | Trace | n/a | Trace | Trace |
| Bottom Clear Time | n/a | 1" | 15" | n/a | 1" | 12" | n/a | 1" | 12" |
| pH | 7.29 | 7.20 | 6.63 | 7.09 | 7.04 | 6.56 | 7.24 | 7.13 | 6.60 |
| Particle Size ($d_{0.5}$ μm) | 1.68 | 2.00 | 2.22 | 1.69 | 1.89 | 2.66 | 1.70 | 1.84 | 2.29 |
| Viscosity (50 $s^{-1}$ mPa) | 126.0 | 156.7 | 200.4 | 128.3 | 155.7 | 201.9 | 129.0 | 154.6 | 185.1 |
| Sieve Residue (% > 150 μm) | n/a | 0.032 | 0.032 | n/a | 0.027 | 0.032 | n/a | 0.031 | 0.033 |

Results

As can be seen in Table 10, formulations of the present invention blended with Nipslt INSIDE® are physically stable following accelerated storage testing.

Example 7-Preparing a Stable Mandestrobin, Ethaboxam, and Metalaxyl Formulation

TABLE 11

| Ingredient | 11A | 12A | 13A | 14A | 15A |
|---|---|---|---|---|---|
| Ethaboxam | 2.38 | 2.38 | 2.35 | 2.35 | 2.35 |
| Metalaxyl | 1.27 | 1.27 | 1.25 | 1.25 | 1.25 |
| Mandestrobin | 3.17 | 3.17 | 3.13 | 3.13 | 3.13 |
| Methyloxirane polymer | 0.065 | 0.065 | 0.065 | 0.065 | 0.065 |
| Sodium salt of naphthalene sulfonate condensate | 0.262 | 0.262 | 1.262 | 1.262 | 0.262 |
| Mixture of sodium salt of alkyl vinyl ether/maleic acid half-ester copolymer and polyvinyl pyrrolidone | 0.065 | 1.065 | 0.065 | 0.065 | 0.065 |

TABLE 11-continued

| Ingredient | 11A | 12A | 13A | 14A | 15A |
|---|---|---|---|---|---|
| Alkylphenol ethoxylate free nonionic wetter and dispersant package | 1.0 | — | 1.0 | — | — |
| Polyoxyethylene tristyrylphenol phosphate, potassium salt | — | — | 1.0 | 3.0 | 3.0 |
| Colorant dispersion | — | — | 7.33 | 7.33 | 7.33 |
| 19.3% 1,2-benzisothiazolin-3-one | 0.24 | 0.24 | 0.24 | 0.24 | 0.24 |
| Carnauba wax, 25% emulsion | 2.5 | 2.5 | 2.5 | 2.5 | 2.5 |
| Silicone emulsion | 0.026 | 0.026 | 0.026 | 0.026 | 0.026 |
| Xanthan gum | 0.3 | 0.151 | 0.3 | 0.3 | 0.3 |
| Propylene glycol | 35.381 | 35.441 | 34.041 | 34.041 | 34.041 |
| Water | Q.S. | Q.S. | Q.S. | Q.S. | Q.S. |

Stepfac™ TSP PE-K (CAS #163436-84-8) is polyoxyethylene tristyrylphenol phosphate, potassium salt and is available from Stepan Corp.

Michem® Lube 156P (CAS# proprietary) is used as the source of carnauba wax (25% emulsion in water) and is a registered trademark of and available from Michelman Inc.

Agrocer® Red 112 is used as the source of colorant dispersion and is a registered trademark and available from Clariant AG.

Method

Methyloxirane polymer, a sodium salt of naphthalene sulfonate condensate, a mixture of sodium salt of alkyl vinyl ether/maleic acid half-ester copolymer and polyvinyl pyrrolidone and a silicone emulsion were added to water under mechanical agitation until dissolved to create an excipient solution. Mandestrobin and ethaboxam were then dispersed in the excipient solution to create an active dispersion. The active solution was then milled with ceramic beads until the median particle diameter was less than 2.0 μm to achieve a milled suspension. Finally, an aqueous solution of xanthan gum and 19.3% 1,2-benzisothiazolin-3-one was added to the milled suspension to create a mill base. 20.8 grams of metalaxyl was dissolved in 179.2 grams of propylene glycol at 54° C. and then stirred to create a metalaxyl/propylene glycol solution. Additional aqueous solution of xanthan gum and 19.3% 1,2-benzisothiazolin-3-one, either alkylphenol ethoxylate free nonionic wetter and dispersant package or additional amount of a mixture of sodium salt of alkyl vinyl ether/maleic acid half-ester copolymer and polyvinyl pyrrolidone, 25% carnauba wax emulsion, the rest of propylene glycol, and the metalaxyl solution were then added to the mill base while undergoing agitation to create the final formulations.

Example 8-Storage Stability of Formulations 11A and 12A

Formulations 11A and 12A from Table 11, above, were each separately subjected to 5 cycles of freeze thaw, 2 weeks at 54° C. and 4 and 8 weeks at 50° C. The physical properties of the Formulations 11A and 12A are detailed in Table 12, below. Bottom clear time is the time until the formulation flows away from the container bottom when approximately 62.5 milliliters of the formulation is placed in a 125-milliliter plastic jar and placed on its side. Formulations 11A and 12A were prepared as a small batch and 20 grams of each were stored in separate 30-milliliter glass vial.

TABLE 12

| | 11A | | | | | 12A | | | | |
|---|---|---|---|---|---|---|---|---|---|---|
| | Initial | F/T Cycle | 2 Weeks 54° C. | 4 Weeks 50° C. | 8 Weeks 50° C. | Initial | F/T Cycle | 2 Weeks 54° C. | 4 Weeks 50° C. | 8 Weeks 50° C. |
| Syneresis % | — | 0 | 2.97% | 9.43% | 30.77% | — | 7.50% | 9.21% | 9.30% | 13.30% |
| Bottom Clear Time | — | 1 s | 1 s | 1 s | 1 s | — | 1 s | 1 s | 1 s | 1 s |
| Sprayability | 0.000% | 0.000% | 0.000% | 0.000% | 0.006% | 0.000% | 0.003% | 0.000% | 0.003% | 0.003% |
| pH | 6.88 | 6.66 | 6.37 | 6.42 | 5.91 | 6.08 | 5.97 | 5.50 | 5.54 | 5.32 |
| Viscosity (1 s$^{-1}$ mPa) | 1860 | 1985 | 2047 | 20.18 | 2075 | 1333 | 1352 | 1569 | 1477 | 1385 |
| Viscosity (50 s$^{-1}$ mPa) | 117.5 | 126.8 | 134.3 | 132.9 | 135.4 | 99.09 | 103.6 | 125.6 | 115.8 | 111.4 |
| G' (t = 0.1 Pa) | 3.985 | 4.232 | 4.613 | 4.517 | 4.38 | 2.582 | 2.711 | 3.083 | 2.962 | 2.666 |
| G" (t = 0.1 Pa) | 2.257 | 2.405 | 2.615 | 2.568 | 2.607 | 1.779 | 1.848 | 2.114 | 2.039 | 1.979 |
| G'/G" ratio | 1.77 | 1.76 | 1.76 | 1.76 | 1.68 | 1.45 | 1.47 | 1.46 | 1.45 | 1.35 |

TABLE 13

| | 13A | | | | | 14A | |
|---|---|---|---|---|---|---|---|
| | Initial | F/T Cycle | 2 Weeks 54° C. | 4 Weeks 50° C. | 8 Weeks 50° C. | F/T Cycle | 2 Weeks 54° C. |
| Syneresis % | — | 0.00% | 0.00% | 6.67% | 0.15% | 0.00% | 0.00% |
| Bottom Clear Time | — | 1 s | 2 s | 1 s | 3 s | 1 s | 1 s |
| Sprayability | 0.00% | 0.00% | 0.00% | 0.00% | 0.003% | 0.00% | 0.00% |
| pH | 6.46 | 6.47 | 5.81 | — | 6.77 | 7.79 | 7.45 |
| Viscosity (1 s$^{-1}$ mPa) | 2183 | 2234 | 2616 | 4410 | 4389 | 2353 | 2650 |
| Viscosity (50 s$^{-1}$ mPa) | 138.2 | 146.3 | 161.3 | 152 | 197.5 | 149.7 | 163.2 |
| G' (t = 0.1 Pa) | 5.264 | 5.551 | 6.171 | 15.1 | 22.05 | 5.329 | 5.903 |
| G" (t = 0.1 Pa) | 2.835 | 2.949 | 3.198 | 3.466 | 4.606 | 2.912 | 3.163 |
| G'/G" ratio | 1.86 | 1.88 | 1.93 | 4.36 | 4.79 | 1.83 | 1.87 |

TABLE 13-continued

| | | | 15A | | |
|---|---|---|---|---|---|
| | Initial | F/T Cycle | 2 Weeks 54° C. | 4 Weeks 50° C. | 8 Weeks 50° C. |
| Syneresis % | — | 2.70% | 5.63% | — | 0.06% |
| Bottom Clear Time | — | 1 s | 1 s | — | 8s |
| Sprayability | 0.00% | 0.00% | 0.00% | 0.001% | 0.004% |
| pH | 6.55 | 6.53 | 6.16 | — | 7.46 |
| Viscosity (1 s$^{-1}$ mPa) | 2332 | 23.5 | 2380 | 3487 | 3167 |
| Viscosity (50 s$^{-1}$ mPa) | 142.4 | 142.3 | 150.5 | 140.3 | 150.2 |
| G' (t = 0.1 Pa) | 5.277 | 5.202 | 5.399 | 8.994 | 5.552 |
| G" (t = 0.1 Pa) | 2.883 | 2.854 | 2.969 | 2.923 | 2.967 |
| G'/G" ratio | 1.83 | 1.82 | 1.82 | 3.08 | 1.87 |

Results

As can be seen in Tables 12 and 13, formulations of the present invention are physically stable following accelerated storage testing.

What is claimed is:

1. A stable agricultural formulation comprising:
   about 5.3% w/w ethaboxam;
   about 2.8% w/w metalaxyl;
   about 3.5% w/w 3-(difluoromethyl)-1-methyl-N-[(3R)-1,1,3-trimethyl-2,3-dihydroinden-4-yl]pyrazole-4-carboxamide;
   about 43% w/w propylene glycol;
   water;
   from about 1.9% to about 2.5% w/w methyloxirane polymer;
   about 0.2% w/w of a sodium salt of naphthalene sulfonate condensate;
   from about 0.5% w/w to about 0.7% w/w a mixture of sodium salt of alkyl vinyl ether/maleic acid half-ester copolymer and polyvinyl pyrrolidone;
   about 0.02% w/w of a silicone emulsion; and
   from about 0.12% to about 0.24% w/w of a first component comprising about 19.3% w/w of 1, 2-benzisothiazolin-3-one, wherein w/w of 1,2-benzisothiazolin-3-one denotes weight by total weight of the first component,
wherein w/w denotes weight by total weight of the composition formulation unless otherwise indicated.

2. The agricultural formulation of claim 1, further comprising clothianidin.

3. An agricultural formulation comprising:
   about 3.13% w/w mandestrobin;
   about 2.35% w/w ethaboxam;
   about 1.25% w/w metalaxyl;
   about 34.04% w/w propylene glycol;
   about 7.33% w/w of a colorant dispersant;
   about 0.065% w/w methyloxirane polymer;
   about 0.26% or 1.26% w/w of a sodium salt of naphthalene sulfonate condensate;
   about 0.065% w/w of a mixture of sodium salt of alkyl vinyl ether/maleic acid half-ester copolymer and polyvinyl pyrrolidone;
   about 0.026% w/w of a silicone emulsion;
   about 0.3% w/w xanthan gum;
   about 0.24% w/w 1, 2-benzisothiazolin-3-one prepared at a concentration of 19.3%;
   about 1.0% or 3.0% w/w polyoxyethylene tristyrylphenol phosphate, potassium salt;
   about 2.5% w/w carnauba wax; and
   optionally, about 1.0% w/w alkylphenol ethoxylate free nonionic wetter and dispersant package,
wherein w/w denotes weight by total weight of the formulation.

4. A method of protecting plants comprising treating plant propagation material with a fungicidally effective amount of the product of claim 1.

5. A method for controlling or preventing pest damage of plants comprising applying to the plant propagation material an effective amount of the product of claim 1.

6. A process for preparing an agricultural formulation comprising ethaboxam, metalaxyl and a compound selected from the group consisting of 3-(difluoromethyl)-1-methyl-N-[(3R)-1,1,3-trimethyl-2,3-dihydroinden-4-yl]pyrazole-4-carboxamide and mandestrobin comprising the steps of:
   bead milling ethaboxam and the compound selected from the group consisting of 3-(difluoromethyl)-1-methyl-N-[(3R)-1,1,3-trimethyl-2,3-dihydroinden-4-yl]pyrazole-4-carboxamide and mandestrobin to create a mill base;
   adding metalaxyl to propylene glycol and stirring to create a metalaxyl solution; and
   adding the metalaxyl solution to the mill base while agitating to create the agricultural mixture, wherein w/w denotes weight by total weight of the formulation.

7. The process of claim 6, wherein mill base comprises from about 1% to about 50% w/w ethaboxam and from about 1% to about 50% w/w of the compound selected from the group consisting of 3-(difluoromethyl)-1-methyl-N-[(3R)-1,1,3-trimethyl-2,3-dihydroinden-4-yl]pyrazole-4-carboxamide and mandestrobin.

8. The process of claim 6, wherein the mill base further comprises methyloxirane polymer, a sodium salt of naphthalene sulfonate condensate, a mixture of sodium salt of alkyl vinyl ether/maleic acid half-ester and polyvinyl pyrrolidone, a silicone emulsion, xanthan gum, 1,2-benzisothiazolin-3-one and water.

9. The process of claim 8, wherein methyloxirane polymer is at a concentration from about 0.1% to about 2% w/w, the sodium salt of naphthalene sulfonate condensate is at a concentration from about 0.1% to about 2% w/w, the mixture of sodium salt of alkyl vinyl ether/maleic acid half-ester and polyvinyl pyrrolidone is at a concentration from about 0.1% to about 1.1% w/w, the silicone emulsion is at a concentration from about 0.01% to about 1.0% w/w, xanthan gum is at a concentration from about 0.01% to about 1.0% w/w, 1,2-benzisothiazolin-3-one prepared at a concentration of 19.3% is at a concentration from about 0.01% to about 1.0% w/w and water is at a concentration from about 18% to about 98% w/w.

10. The process of claim 6, wherein the metalaxyl solution comprises from about 1% to about 20% w/w metalaxyl.

11. The process of claim 6, wherein the agricultural formulation further comprises additional propylene glycol, a wetting agent selected from the additional methyloxirane polymer, an alkylphenol ethoxylate free nonionic wetter and polyoxyethylene tristyrylphenol phosphate, a colorant dispersion and additional water.

12. The process of claim 11, wherein the agricultural formulation further comprises additional mixture of sodium salt of alkyl vinyl ether/maleic acid half-ester copolymer and polyvinyl pyrrolidone, additional xanthan gum and additional 1,2-benzisothiazolin-3-one.

13. The process of claim 11, wherein the agricultural formulation further comprises clothianidin.

14. The process of claim 6, wherein the agricultural formulation comprises from about 15% to about 35% w/w of the mill base and from about 10% to about 30% w/w of the metalaxyl solution.

15. The process of claim 6, wherein the agricultural formulation comprises from about 10% to about 20% w/w of the additional propylene glycol.

16. The process of claim 6, wherein the agricultural formulation comprises from about 0.5% to about 5% w/w of a wetting agent selected from the group consisting of additional methyloxirane polymer, alkylphenol ethoxylate free nonionic wetter and polyoxyethylene tristyrylphenol phosphate.

17. An agricultural formulation produced by the process of claim 6.

* * * * *